(12) United States Patent
Neumann et al.

(10) Patent No.: US 8,783,759 B2
(45) Date of Patent: Jul. 22, 2014

(54) CHASSIS STRUCTURE FOR A MOTOR VEHICLE

(75) Inventors: Hans-Jügen Neumann, Bielefeld (DE); Hans-Joachim Horenkamp, Bad Lippspringe (DE); Stephan Meyer, Bielefeld (DE); Wolfram Linnig, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 115 days.

(21) Appl. No.: 13/494,596

(22) Filed: Jun. 12, 2012

(65) Prior Publication Data

US 2013/0154310 A1    Jun. 20, 2013

(30) Foreign Application Priority Data

Jun. 16, 2011 (DE) .......................... 10 2011 051 115

(51) Int. Cl.
*B62D 29/00* (2006.01)
*B60G 7/00* (2006.01)

(52) U.S. Cl.
USPC .......................... 296/203.01; 280/784; 164/98

(58) Field of Classification Search
USPC ..................... 296/181.1, 197.3, 203.01, 17.3, 296/203.018; 280/784; 164/98
See application file for complete search history.

(56) References Cited

U.S. PATENT DOCUMENTS

| 6,421,979 | B1 | | 7/2002 | Fischer et al. |
| 6,468,613 | B1 | * | 10/2002 | Kitano et al. ................ 428/35.8 |
| 7,216,860 | B2 | | 5/2007 | Budde et al. |
| 7,334,828 | B2 | | 2/2008 | Budde et al. |
| 7,556,273 | B2 | | 7/2009 | Steubel et al. |
| 2004/0108705 | A1 | * | 6/2004 | Witucki ........................ 280/781 |
| 2004/0130124 | A1 | * | 7/2004 | Hungerink et al. ........... 280/443 |
| 2004/0131418 | A1 | * | 7/2004 | Budde et al. .................. 403/278 |
| 2012/0280534 | A1 | * | 11/2012 | Eipper ..................... 296/187.01 |

FOREIGN PATENT DOCUMENTS

| DE | 199 46 349 | | 3/2001 |
| DE | 101 55 490 | A1 | 5/2003 |
| DE | 100 17 205 | B4 | 7/2006 |
| DE | 102005004917 | A1 | 8/2006 |
| DE | 102006036931 | | 2/2008 |
| EP | 1 084 816 | A2 | 3/2001 |
| WO | WO 03/039893 | | 5/2003 |

* cited by examiner

*Primary Examiner* — Jason S Morrow
(74) *Attorney, Agent, or Firm* — Henry M Feiereisen LLC

(57) ABSTRACT

A chassis structure for a motor vehicle includes a forged base body of light metal and a reinforcement body made of fiber material. The base body and the reinforcement body are bought into forced engagement by an adhesive layer, wherein the base body has at least one first region which is plastically deformed and partially encompasses the reinforcement body by a form fit.

8 Claims, 2 Drawing Sheets

CHASSIS STRUCTURE FOR A MOTOR VEHICLE

CROSS-REFERENCES TO RELATED APPLICATIONS

This application claims the priority of German Patent Application, Serial No. 10 2011 051 115.6, filed Jun. 16, 2011, pursuant to 35 U.S.C. 119(a)-(d), the content of which is incorporated herein by reference in its entirety as if fully set forth herein.

BACKGROUND OF THE INVENTION

The present invention relates to a chassis structure for a motor vehicle.

The following discussion of related art is provided to assist the reader in understanding the advantages of the invention, and is not to be construed as an admission that this related art is prior art to this invention.

Constructional, technological and material lightweight solutions for weight reduction of chassis structures for motor vehicles gain increasingly importance with respect to reduction in fuel consumption and emission. Lightweight materials such as aluminum play a special role to reduce the so-called unsprung masses in the chassis area. This trend is further accelerated by the fact that low-emission or emission-free vehicles with hybrid or electric drive require added weight of about 130 kg to account for the required electric components. This weight has to be compensated through greater weight reduction of other components. To ensure the required high strength and stiffness properties of chassis structures, like pivot bearing, support arm, guide arm, A-arm etc., which are subject to high stress while still having a smallest possible own weight, chassis structures forged from aluminum with yield strength Rp0.2 of above 300 MPa and elongation at rupture A5 of above 10% are increasingly in demand. In addition to the yield strength as dimension criterion, chassis structures are also dimensioned for stiffness to withstand defined buckling loads in particular stress and crash situations. Crucial for the stiffness is the modulus of elasticity of the used material in addition to the cross section configuration. The modulus of elasticity of aluminum is about 70,000 kN/mm$^2$ which is three times smaller than that of steel. As a result, component regions that are critical with respect to stiffness encounter the undesired situation that the solid cross sections common in forged parts have to be increased to satisfy the demanded stiffness, causing additional mass and thus increased weight. As vehicles are built increasingly more compact also in the area of the chassis, space restrictions prohibit however a random increase of component cross sections in order to realize the required values for the stiffness-relevant section modulus of the component cross section, e.g. through use of lightweight hollow sections of greater diameter instead of massive cross sections.

As the stiffness-relevant modulus of elasticity of lightweight materials, like aluminum or other materials, can be influenced within very narrow limits only, known solutions propose the use of composites with materials of higher modulus of elasticity. For example, it is known to forge steel structures of varying geometric shape and thickness with a modulus of elasticity of about 210,000 kN/mm$^2$ onto stiffness-relevant regions of forged aluminum parts. Galvanic susceptibility to corrosion between galvanically relevant contact zones between aluminum base material and steel structure as well as corrosion of the steel surface itself has however been proven problematic. This is especially true when considering that such forged aluminum parts cannot be provided with an additional corrosion protection layer for cost reasons.

The use of various types of composites, e.g. composite of layers, particle composites, fiber composites etc., in shipbuilding, aircraft construction etc., have also been known which involve a layering of varying materials. These technologies are however unsuitable for cost reasons. A further known approach involves the use of metal matrix composites (MMC) which achieve a greater modulus of elasticity through incorporation of ceramic fibers in the aluminum matrix. High production costs for these metal matrix composites limit this technology to special applications and uses however. In particular known from Formula 1 motor racing are CFRP-based complete solutions which however are unsuitable for application in conventional automobile industry in view of their high costs and relatively brittle and deformation-resistant fracture behavior.

It would therefore be desirable and advantageous to provide an improved chassis structure to obviate prior art shortcomings.

SUMMARY OF THE INVENTION

According to one aspect of the present invention, a chassis structure for a motor vehicle includes a forged base body of light metal, a reinforcement body made of fiber material, and an adhesive layer connecting the base body and the reinforcement body by a force fit, wherein the base body has at least one region which is plastically deformed and partially encompasses the reinforcement body by a form fit.

The present invention resolves prior art problems by at least partially strengthening the forged light metal base body of a chassis structure with a reinforcement body of fiber material and connecting the base body and the reinforcement body by way of a force fit realized by an adhesive layer, and a form fit realized by a plastic deformation of at least one region of the base body to grip around the reinforcement body.

Advantageously, the reinforcement body is arranged in a stiffness-relevant section of the chassis structure or base body.

According to another advantageous feature of the present invention, the adhesive layer can be applied across an entire contact area between the base body and the reinforcement body. The reinforcement body may be made of carbon-fiber-reinforced plastic (CFRP).

According to another advantageous feature of the present invention, the adhesive layer can be made of a material on the basis of epoxy resin. The ratio of the modulus of elasticity of the material of the base body and the material of the reinforcement body is advantageously dimensioned between 1:3 and 1:7.

According to another advantageous feature of the present invention, the at least one plastically deformed region to form a connection between the components can extend at a marginal zone of the reinforcement body. The at least one plastically deformed region may in this case be configured in the form of a fold or be turned inwards.

According to another advantageous feature of the present invention, the base body can have at least one other region which extends through an opening in the reinforcement body and is plastically deformed. These types of connections can be configured in the form of rivets, with the plastically deformed region forming a closing head.

A chassis structure according to the present invention is characterized by the required stiffness and has defined portions to cope with buckling loads while yet complying with the given restrictions with respect to installation space in the absence of any increase in wall thickness to increase the section modulus of stiffness-relevant components, as has been proposed heretofore. A chassis structure according to the present invention exhibits only slight elastic deformation during normal operation when facing various stress situations while exhibiting high malleability in the event of abuse or crash to absorb energy through deformation and to maintain functional connections between individual chassis structures up to a define rupture in a controlled manner. The chassis structure is configured and the base body and reinforcement body interact such that no parts of the vehicle become loose and could pose a threat as uncontrolled flying objects when the breaking load is exceeded. This requirement is also designated as "fail safe behavior".

Practice has shown that a chassis structure according to the present invention is especially beneficial when the preformed reinforcement body, preferably carbon shells (CFRP shells), is configured for a high modulus of elasticity, e.g. up to 380,000 MPa, i.e. five time greater than aluminum with about 70,000 kN/mm$^2$, and permanently applied in a force-fitting and form-fitting manner onto respectively configured regions of the forged base body with partly higher stiffness requirements. The lasting connection involves a combination of force-fitting connection through adhesive application, advantageously an adhesive on the basis of epoxy resin, and a form-fitting connection through complete or partial folding of the edges of the reinforcement body and/or additional point or linear plastic deformation, e.g. riveting or crimping of particular regions of the base body with the reinforcement body. Through plastic deformation, partial regions of the base body are formed as connections from the material of the base body to formfittingly encompass or grip around the reinforcement body. The adhesive for implementing the force-fitting connection is applied across the surface at a particular thickness either on the joining side of the reinforcement body or the joining side of the light metal base body, while at the same time providing a compensation medium for any irregularities on the surfaces of the two components being joined. This ensures a force-fitting adhesive contact across the entire surface between reinforcement body and base body. Folding or crimping of the reinforcement body with the base body is made possible by forging the base body with a continuous or breached score line and linear elevations such as webs or sporadic elevations like hubs. The CFRP shell is placed upon the forging surface of the base body and held stably after application of the adhesive via the fold and/or matching openings and via the continuous or breached webs and/or nubs. Fold, webs, and nubs on the forged part as well as respective openings on the CFRP shell provide at the same time precise guiding and positioning aids for the CFRP shell on the base body. In a further operating cycle, the fold, webs, and nubs can be formed with a suitable tool, the fold are bent over, and the nubs pressed flatly or, depending on the configuration riveted or compressed so that the CFRP shell is pressed overall flatly onto the surface of the base body in a force-fitting manner by the adhesive layer and formfittingly connected by the plastically joined connection elements in the form of folds and rivets. As the CFRP shell is applied onto the stiffness-relevant surface zones of the base body, i.e. at maximum distance from the neutral lines, maximum stiffness effects with minimum CFRP material use, e.g. with minimum material thickness and respective weight reduction, can be realized in accordance with the physical dependence of the stiffness-relevant cross sectional moments of inertia from radius to neutral line in $3^{rd}$ power. The approach taken by the present invention may be expanded when for example two-point arms or rod arms used in great quantities have not only regions reinforced with CFRP but is realized in the form of a CFRP half-shell. One half of the base body is hereby configured as a typical forged part with two through-passages, and the other half of the base body is a CFRP half or CFRP half-shell which is also provided with through passages, just like the light-metal forged half, for receiving rubber bearings for example. The base body and the reinforcement body have thus corresponding openings. The parting plane of the forged half for receiving the CFRP half as CFRP reinforcement is provided with the afore-described form-fitting and force-fitting connections depending on the technical need at hand.

Compared to the state of the art which proposed to provide areas of higher stiffness basically only through increase of the cross section or wall thickness, i.e. ultimately weight increase, the approach taken by the present invention has the advantage that the union of ductile light metal material, advantageously aluminum, with highly rigid CFRP material, through use of the connections according to the present invention, is able to satisfy the need for reduced weight despite the seemingly contradictory demands on these structures, i.e. during normal operation the structures should exhibit only slight elastic deformations under most different stress situations, while exhibiting high malleability in the event of abuse and crash so as to absorb energy through deformation and to maintain functional connections between individual chassis structures up to a define rupture in a controlled manner. The additional stiffness functions are assumed by the reinforced section(s) or half-shell reinforcement body or bodies, in particular CFRP reinforcement(s), whereas the forged base body in its function as support element receives the reinforcement body in a lasting form-fitting and force-fitting connection in accordance with the present invention and provides the plastic deformation and energy absorption in the event of abuse or crash.

It will be understood by persons skilled in the art that one or more reinforcement bodies may be provided on one base body. Material selection, geometric arrangement and joining of base body and reinforcement body or bodies are suited to the desired stress behavior at hand. The demands on providing "fail safe behavior" can be satisfied with minimized weight, using the lasting material combination according to the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
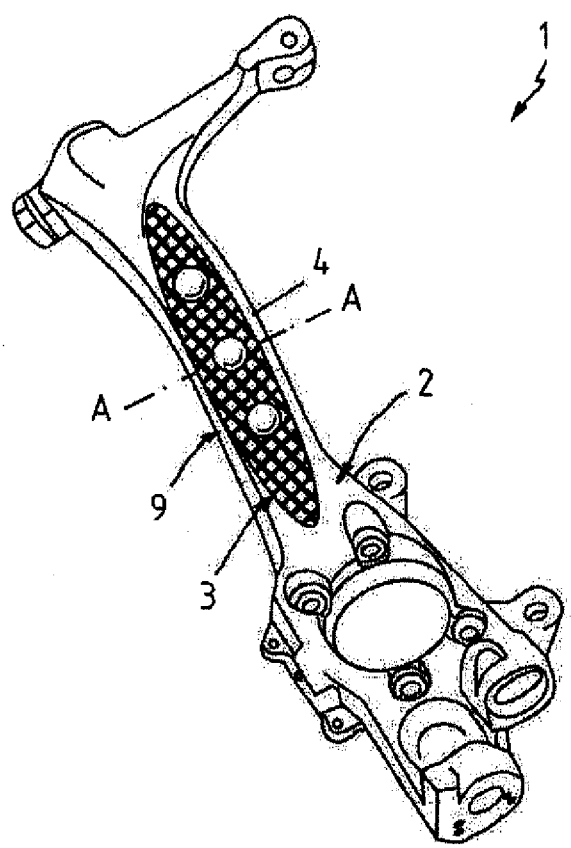
FIG. 1 is a schematic illustration of a chassis structure according to the present invention in the form of a pivot bearing by way of example.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
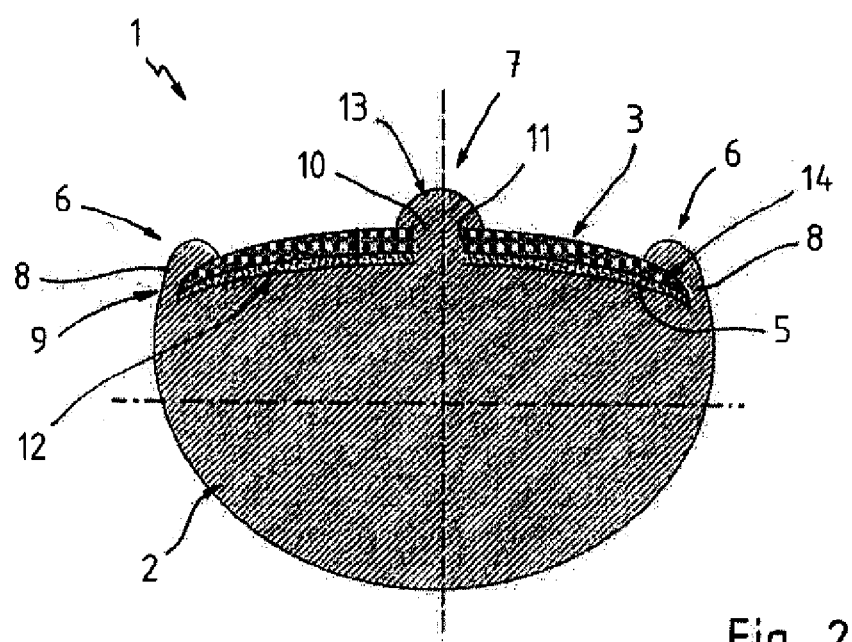
FIG. 2 is a sectional view of the chassis structure of FIG. 1, taken along the line A-A.

Turning now to the drawing, and in particular to FIG. 1, there is shown a schematic illustration of a chassis structure according to the present invention, generally designated by reference numeral 1 and configured in the form of a pivot bearing by way of example. The chassis structure 1 has a forged base body 2 of aluminum or aluminum alloy, which is joined with a shell-like reinforcement body 3 of carbon-fiber-reinforced plastic. The reinforcement body 3 is arranged in a stress-relevant leg portion 4 of the chassis structure 1. The base body 2 and the reinforcement body 3 are connected with one another in a force-fitting and form-fitting manner. The force-fitting connection is implemented by an adhesive layer 5 (FIG. 2) between the base body 2 and the reinforcement body 3. The form-fitting connection is established by a plastic deformation of regions 6, 7 of the base body 2 to partly encompass the reinforcement body 3.

The adhesive layer 5 is made of an adhesive on the basis of epoxy resin and applied across the entire contact surface between the base body 2 and the reinforcement body 3. The adhesive layer 5 provides also compensation of any unevenness in the joining surfaces between the base body 2 and the reinforcement body 3.

The form-fitting connection between the base body 2 and the reinforcement body 3 is realized through plastic deformation of the regions 6, 7 of the base body 2. The regions 6, 7 are formed during forging manufacture of the base body as webs 8 at the edge 9 of the base body 2 and as nubs 10 in the leg portion 4. The reinforcement body 3 is provided with an opening 11 to form a rivet hole. The reinforcement body 3 is placed upon a receiving zone 12 of the base body 2, with the adhesive layer 5 being interposed there between. The reinforcement body 3 is hereby placed with the opening 11 over the nub 10 and positioned between the webs 8. Thereafter, the webs 8 and the nub 10 are plastically deformed so that the marginal webs 9 are turned inwards, and ends 13 of the nubs 10 are pressed flatly or compressed. During deformation, the opening 11 is filled by the material of the nub 10. The plastically deformed regions 6 encompass the edge 14 of the reinforcement body 3. The plastically deformed regions 7 form a closing head and grip the reinforcement body 3 around the opening 11. The base body 2 and the reinforcement body 3 are then connected in a force-fitting and form-fitting manner.

Figure 3:
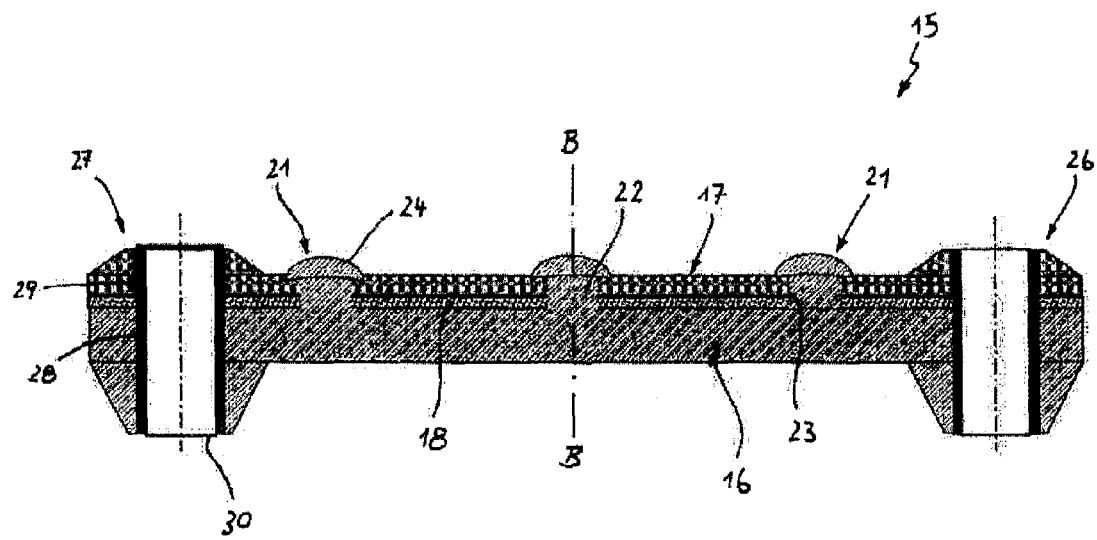
FIG. 3 is a schematic illustration of a chassis structure according to the present invention in the form of a guide arm by way of example.

FIG. 3 shows a schematic illustration of a chassis structure according to the present invention generally designated by reference numeral 15 and configured in the form of a guide arm by way of example. The chassis structure 15 is also formed by a forged base body 16 and a reinforcement body 17. The base body 16 is made of light metal, in particular aluminum or aluminum alloy. The reinforcement body 17 is made of a fiber material, e.g. carbon-fiber-reinforced plastic. The base body 16 forms a structure half, and the reinforcement body 17 forms the other structure half.

Figure 4:
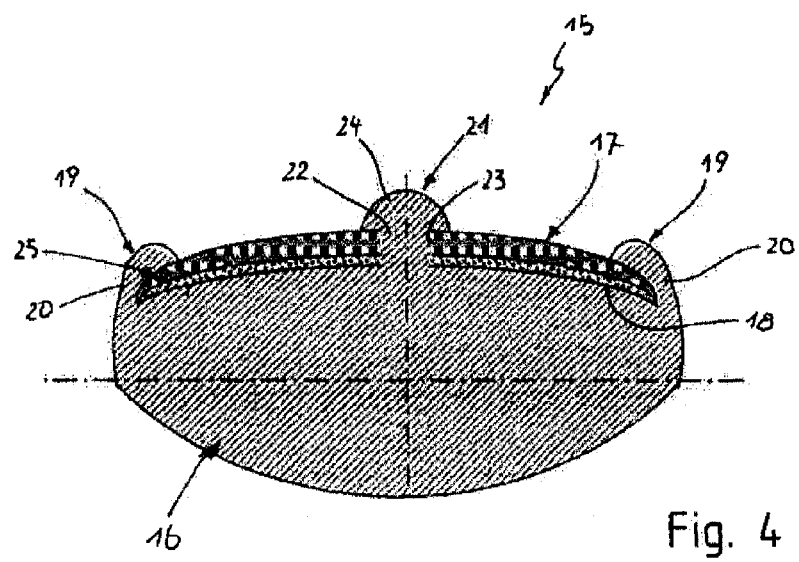
FIG. 4 is a sectional view of the chassis structure of FIG. 1, taken along the line B-B.

The base body 16 and the reinforcement body 17 are connected with one another in a force-fitting manner by an adhesive layer 18 (cf. also FIG. 4) which is applied across the entire contact surface between the base body 16 and the reinforcement body 17. Marginal regions 19 in the form of webs 20 and pin-like regions 21 in the form of nubs 22 of the base body 16 are plastically deformed and grip partially around the reinforcement body 17. The pin-like regions 21 pass through openings 23 in the reinforcement body 17, with the projecting ends 24 being plastically deformed to form a closing head. The marginal webs 20 are turned inwards by a plastic deformation and encompass the marginal regions 25 of the reinforcement body 17.

The base body 16 and the reinforcement body 17 have corresponding openings 28, 29 in the end portions 26, 27 of the chassis structure 15 to establish through-passages for receiving rubber bearings 30.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A chassis structure for a motor vehicle, comprising:
   a forged base body of light metal;
   a reinforcement body made of carbon-fiber-reinforced plastic (CFRP); and
   an adhesive layer connecting the base body and the reinforcement body by a force fit,
   wherein the base body has at least one first region which is plastically deformed and partially encompasses the reinforcement body by a form fit.

2. The chassis structure of claim 1, wherein the adhesive layer is applied across an entire contact area between the base body and the reinforcement body.

3. The chassis structure of claim 1, wherein the adhesive layer is made of a material on the basis of epoxy resin.

4. The chassis structure of claim 1, wherein the at least one first region extends at a marginal zone of the reinforcement body.

5. The chassis structure of claim 1, wherein the base body has at least one second region which extends through an opening in the reinforcement body and is plastically deformed.

6. The chassis structure of claim 1, wherein the reinforcement body is arranged in a stiffness-relevant portion of the base body.

7. The chassis structure of claim 1, wherein the base body is made of a material defined by a first modulus of elasticity, and the reinforcement body is made of a material defined by a second modulus of elasticity, wherein the first modulus of elasticity and the second modulus of elasticity are defined at a ratio between 1:3 and 1:7.

8. The chassis structure of claim 1, wherein the base body and the reinforcement body have corresponding openings.

* * * * *